(12) United States Patent
Becker et al.

(10) Patent No.: US 10,670,215 B2
(45) Date of Patent: Jun. 2, 2020

(54) LIGHT BAR COVER AND RELATED METHODS

(71) Applicants: Aaron Becker, Sanger, CA (US); Matthew Spear, Ravenna, OH (US)

(72) Inventors: Aaron Becker, Sanger, CA (US); Matthew Spear, Ravenna, OH (US)

( * ) Notice: Subject to any disclaimer, the term of this patent is extended or adjusted under 35 U.S.C. 154(b) by 0 days.

(21) Appl. No.: 16/591,565

(22) Filed: Oct. 2, 2019

(65) Prior Publication Data
US 2020/0103089 A1  Apr. 2, 2020

Related U.S. Application Data

(60) Provisional application No. 62/740,343, filed on Oct. 2, 2018.

(51) Int. Cl.
| | |
|---|---|
| *F21V 1/16* | (2018.01) |
| *F21V 11/00* | (2015.01) |
| *F21S 41/29* | (2018.01) |
| *F21S 41/20* | (2018.01) |
| *F21S 41/141* | (2018.01) |
| *F21S 45/10* | (2018.01) |
| *B60Q 1/00* | (2006.01) |
| *B60Q 1/18* | (2006.01) |
| *F21Y 115/10* | (2016.01) |
| *F21W 107/10* | (2018.01) |
| *F21S 45/50* | (2018.01) |

(52) U.S. Cl.
CPC .......... *F21S 41/29* (2018.01); *B60Q 1/0005* (2013.01); *F21S 41/141* (2018.01); *F21S 41/285* (2018.01); *F21S 45/10* (2018.01); *B60Q 1/18* (2013.01); *F21S 45/50* (2018.01); *F21W 2107/10* (2018.01); *F21Y 2115/10* (2016.08)

(58) Field of Classification Search
CPC ............... B60Q 1/00–0005; F21S 41/00–295
USPC ..................................... 362/509, 540–545
See application file for complete search history.

(56) References Cited

U.S. PATENT DOCUMENTS 8,545,049 B2   10/2013  Davis et al.

OTHER PUBLICATIONS

Brute Force Covers—LED Light Bar Covers—dated Jun. 1, 2017—retrieved from http://bruteforcecovers.com:80/products/50-led-light-bar-cover.

*Primary Examiner* — Jason M Han
(74) *Attorney, Agent, or Firm* — William K. Nelson

(57) ABSTRACT

The present invention relates to improved light bar cover for LED light bars. The presently disclosed light bar covers may cover the full circumference and length of a light bar and may include a multi-functional tool for easing the installation or removal. While installed, the light bar cover protects the light bar from various damages such as debris or the elements. The multi-function tool may be used to assist in the removal and installation of the cover when mounted in hard to access location. In various embodiments the multi-function tool may be used to deploy the cover, provide rigidity to the cover, and/or actuate a fastener for the cover.

20 Claims, 9 Drawing Sheets

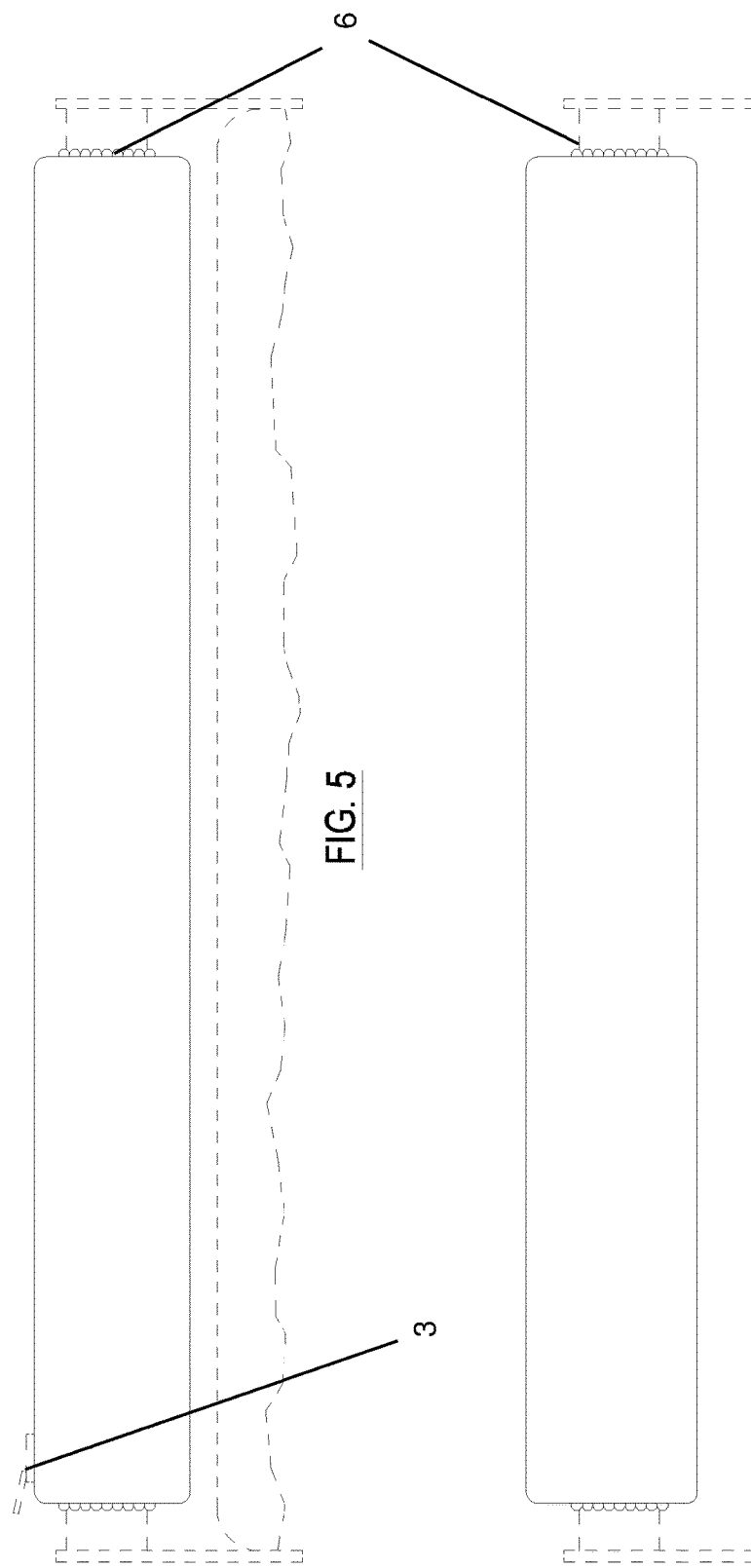
FIG. 5
FIG. 6
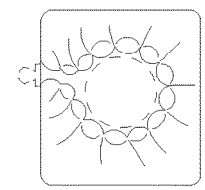
FIG. 8
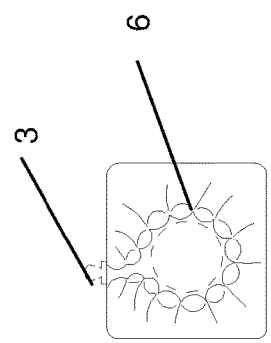
FIG. 7

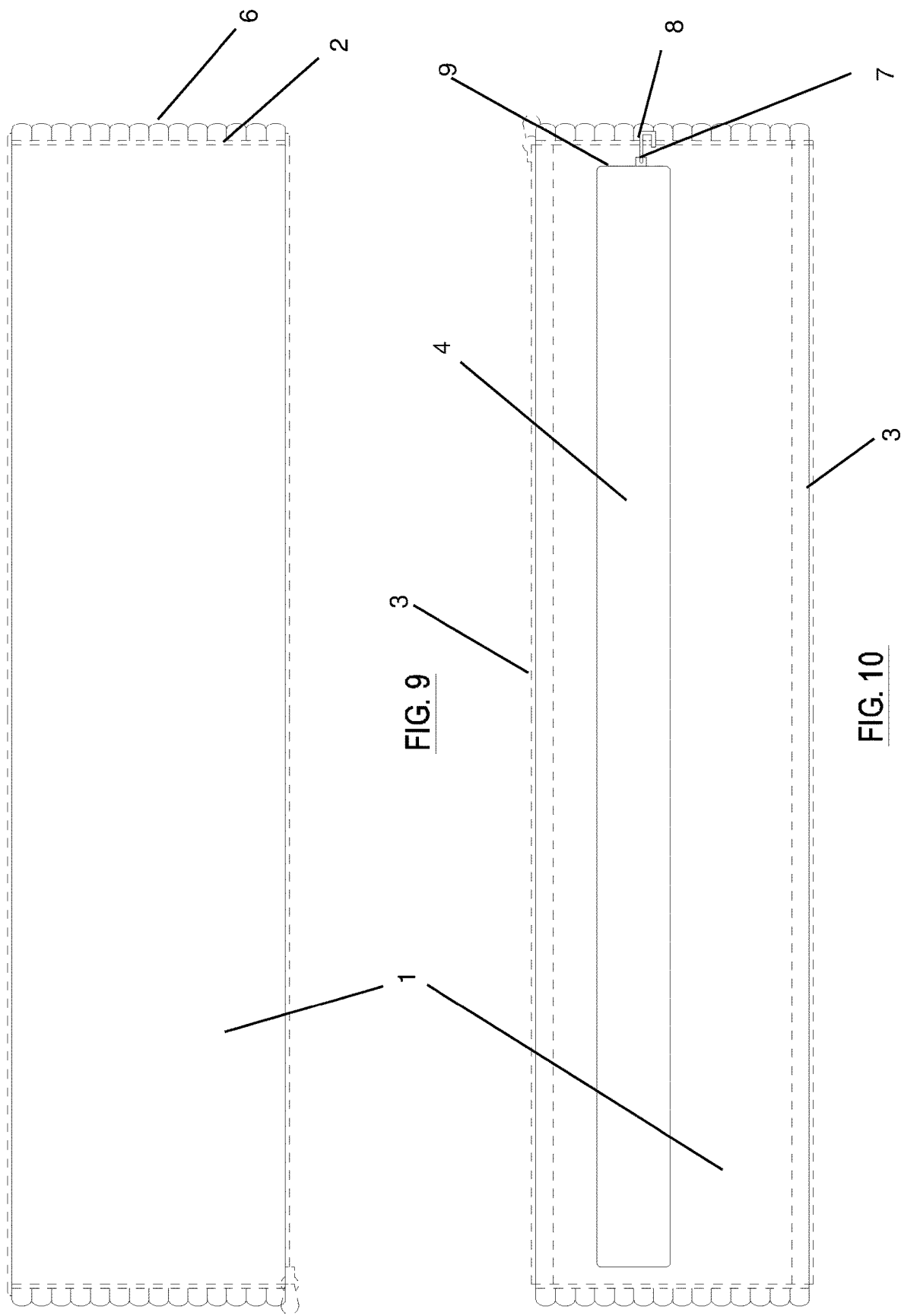

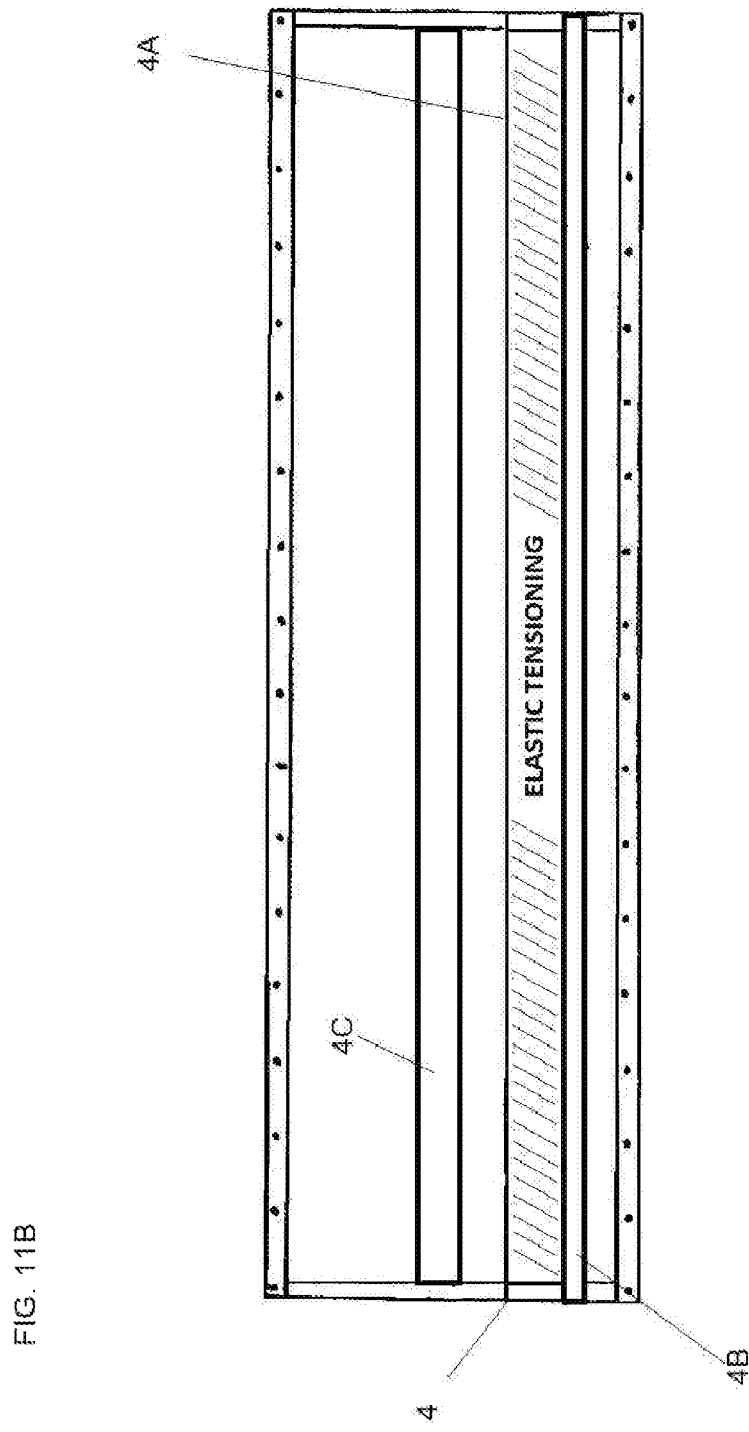

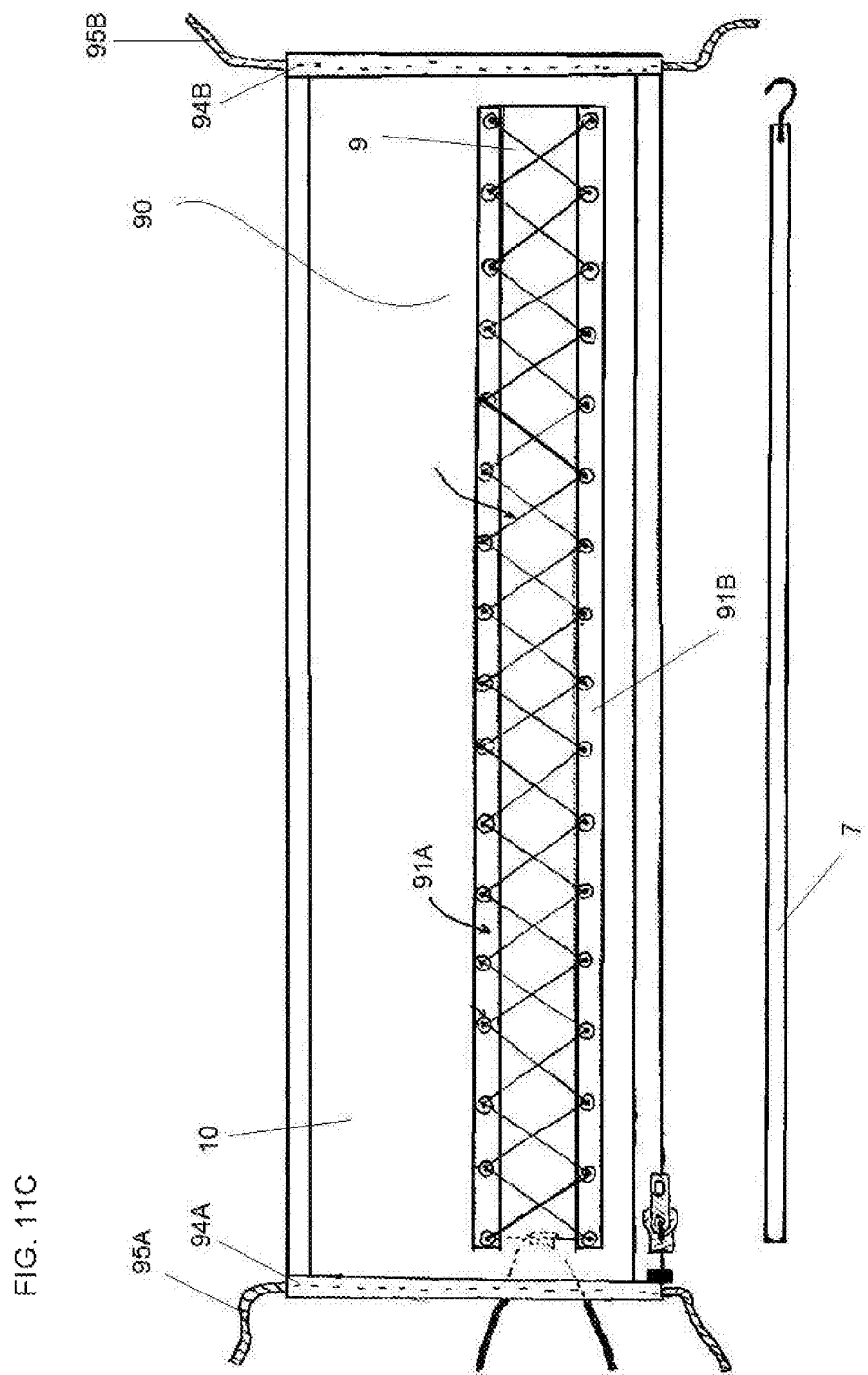

LIGHT BAR COVER AND RELATED METHODS

FIELD OF THE INVENTION

The present invention relates to a flexible, durable light bar cover having an adjustable radius and a stiffening element that allows the cover to be more easily positioned on a light bar of a vehicle.

DISCUSSION OF THE BACKGROUND

Light-emitting diode (LED) light bars a common aftermarket accessory for off-road and other sport utility vehicles, and emergency vehicles providing improved visibility in low-light conditions and programmable light arrays. LEDs are small, completely solid state, very power-efficient, long-lasting (as they have no filaments to burn out) and can be seen very easily even at great distances and in sunlight.

LED-based light bars can be made very thin, reducing wind resistance by around 8-10 percent. LED lights are also programmable with a wider variety of flash patterns because of their ability to be switched directly by electronic controllers, as opposed to discharging a capacitor through a gas-filled tube.

LED light bars are typically mounted across the roof or anterior to the roof of the vehicle to provide an overhead light without obstruction of the driver's view. Because light bars are mounted on vehicles, the face of the light bar is constantly exposed to dust, scratches and heat of the sun that can shorten the life of light bar. Thus, the useful life and appearance of a light bar can be aided by a protective cover. Many state laws require an opaque cover to be placed over such light bars as a safety precaution on the roads.

However, because of the length, position height, and position on the vehicle, it is difficult to apply a protective cover to the light bar. A person is required to reach up above the vehicle to access the light bar to try and place the cover on the light bar, and can only reach one side of the vehicle at a time. Thus, putting a light cover on a vehicle-mounted light bar is an awkward and challenging task, which may require the use of ladders and the assistance of another person.

Another problem is that light bars come in varied sizes and often without a light bar cover. Thus, light bar covers misfit many of the different light bar designs in the market.

Improved light bar covers are needed to overcome the drawbacks of conventional mechanical covers.

SUMMARY OF THE INVENTION

The present invention provides improved light bar cover for LED light bars. The presently disclosed light bar covers may cover the full circumference and length of a light bar and may include a multi-functional tool for easing the installation or removal. While installed, the light bar cover protects the light bar from various damages such as debris or the elements. The multi-function tool may be used to assist in the removal and installation of the cover when mounted in hard to access location. In various embodiments the multi-function tool may be used to deploy the cover, provide rigidity to the cover, and/or actuate a fastener for the cover.

The light bar cover may include a durable outer material for wrapping around the exterior of a conventional light bar such as a marine-grade, UV and water-resistant canvas material, to protect the light bar from the elements. In some embodiments, the material may be a nylon, polyester, neoprene, or other durable fabric that is sufficiently thick to substantially protect against UV penetration and may be chemically treated to be water-resistant. The light bar cover may have a perimeter shape that approximates the circumference and length of standard light bar sizes, with some ability to accommodate variations in such shapes. The light bar cover may have fasteners that allow it to be fastened around such light bars. In various embodiments, the fasteners may be zippers, hook and loop fasteners (Velcro), snaps, and/or other fastener mechanisms. In a preferred embodiment, the fasteners may be a zipper that runs along opposing lengths of the light bar cover.

A feature of the light bar cover that allows it to accommodate multiple light bar shapes is the cinchable lateral ends of the cover. In some embodiments, the light bar cover may include elastic hemming on the lateral ends of the cover. One or more elastic bands may be attached to the lateral ends of the cover to provide the functionality to cinch the lateral ends around support elements (e.g., bars) attached to the lateral ends of a light bar. In some embodiments, each lateral side of the light bar cover may include a hem that encloses a cinchable band that can be tightened around the support elements at the lateral ends of a light bar. For example, an elastic rope or bungee cord may be enclosed in a hemmed slot along each lateral end of the light bar cover with connectors at each end that allow the elastic rope or bungee cord to be tightened around the support elements at the lateral ends of a light bar.

The light bar cover of the present invention may also include an interior expansion mechanism for adjustment of the dimension of the light bar cover that corresponds to the circumference of the light bar (the "circumferential dimension"). This element may include elastic bands or lines, and/or a cinching flap that allows a portion of the circumferential dimension to be taken in to effectively reduce the dimension. In some embodiments, the expansion element may be an expansion flap of material on the inner side of the light bar cover that can be attached at different points along the circumferential dimension, allowing the material of the light bar cover to be taken in or let out. The attachment mechanism for attaching the expansion flap may be hook and loop fasteners (Velcro) that allow attachment at different points on the light bar cover and/or the expansion flap. Other fastening mechanisms may alternatively be used, such as snaps, button fasteners, zippers, etc. In some embodiments, the expansion flap may include elastic materials that aids in pulling in the material of the light bar for a tight fit.

In other embodiments, the expansion element may be elastic cords (e.g., interlacing cords) that are routed between two strips of grommets spaced apart from one another on the interior side of the light bar cover. The elastic cords bring in the circumferential dimension of the light bar cover yet are able to expand providing the length required to extend around the circumference of the light bar to be covered.

In other embodiments, the expansion element may be an elastic band that is expandable along the circumferential dimension of the light bar cover. The elastic band may be of various thicknesses. In some embodiments, the elastic band may run from one lateral side of the light bar cover to the other. The elastic band may bring in the circumferential dimension of the light bar cover yet are able to expand providing the length required to extend around the circumference of the light bar to be covered. In still further embodiments, the expansion element may include a plurality of the elastic bands expandable along the circumferential dimension. For example, the expansion element may include a plurality of elastic bands spaced evenly apart from one lateral side of the light bar cover to the other.

The light bar cover of the present invention may also include a multi-purpose rod that can be stored on the interior of the light bar cover between the expansion flap and the interior side of the light bar cover. The multipurpose rod may serve to provide rigidity to the light bar cover when it is inserted into the light bar cover, allowing one to extend the light bar cover across the length of the light bar when the light bar cover is being installed. This is an important advantage of the present invention, because it is difficult to reach across the entire vehicle (e.g., across the front of a vehicle for a light bar mounted over the windshield of the vehicle). The rigidity provided by the multi-purpose rod allows one to apply the light bar cover to a light bar easily from the ground.

The multi-purpose rod may also include a hook at one end thereof to allow one to remove the light bar cover from the ground. The hooked end of the multi-purpose rod may be used to reach across the car to undo the fasteners that join ends of the light bar cover at the edges of the circumferential dimension of the light bar cover. Specifically, the user may partially open the fasteners joining the ends of the light bar cover to access the multi-purpose rod. The hook of the multi-purpose rod may then be engaged with the fasteners (e.g., a zipper tab) and allow the user to undo the fasteners across the width of the vehicle while remaining on the ground. In some embodiments, the multi-purpose rod may be extendable (e.g., may have a telescoping design).

In some embodiments, the light bar cover may include a separate stiffening element for providing rigidity to the light bar cover from the multi-purpose rod. For example, the light bar cover may include a permanently attached stiffening rod or other structure to maintain the rigidity of the light bar cover. In such embodiments, the light bar cover may include additionally include a multipurpose rod for opening the light bar cover when it is installed and adding extra rigidity to the light bar cover. In still further embodiments, the light bar cover may include a different mechanism for opening the light bar cover, such as a rip cord that runs across the length of the light bar cover and can be pulled by a user from the ground to undue the fasteners binding the circumferential edges of the light bar cover.

The light bar cover of the present invention may additionally include an additional light bar lens pad on the interior side of the cover. The light bar lens pad may be a soft, scratch-preventing materials such as a microfiber, sheepskin, non-woven polypropylene fabric, polyvinyl acetate fabric, and other appropriately non-abrasive materials. The lens pad may have sufficient size and may be positioned on the light bar cover such that it can be reliably place over the light bar lens when the light bar cover is engaged over the light bar. For example, the lens pad should be located near one of the edges of the circumferential dimension such that the edges of the circumferential dimensions and the fasteners at the edges are located at the bottom of the light bar when the lens pad is located on the light bar lens. In this arrangement, the lens is protected and the position of the fasteners of the light bar cover are located inferiorly to allow for drainage of any moisture that may be captured in the light bar cover by gravity. The fasteners of the light bar cover should preferably be positioned on the interior surface of the light bar.

The light bar cover may additionally include one or more additional pockets for storing tools or other implements, such as flashlights, plyers, screwdrivers, multi-purpose tools, etc. Such pockets may be positioned on the exterior side of the light bar cover.

An example use case for the present invention is for installment on an above-window-mounted 52" dual row light bar. However, the various embodiments disclosed herein are applicable to light bars of differing lengths, circumferences, mounting locations or elements. Other example use cases include application to a hood mounted light bar (in which case, the fastener elements may be moved to the top or rear of the light bar cover to allow for ease of operation).

In one aspect, the present invention relates to a device for covering a light bar, comprising a fabric member operable to be wrapped around and cover a light bar, the fabric member including a first fastening member for connected two perimeter edges of the fabric member, and at least one cinchable structure for tightening the base material around the light bar; a structural support rod having a length substantially equal to a length of the fabric member; an interior compartment for storing a structural support rod; and a shortening mechanism for reducing an effective width dimension of the fabric member for adjusting the fabric member to fit over light bars of varying cross-sectional perimeters. The structure support rod may be operable to be removed from the interior compartment and may have a grasping structure operable to grasp the first fastening member and adjust the first fastening member, allowing a user to reach across a vehicle on which the light bar is mounted to grasp the first fastening member without the need to climb up on the vehicle, ladder, or other device. The shortening mechanism may include an adjustable flap of material that may be adjustably attached at different points on the fabric member to take in some of the fabric member to reduce the effective width dimension of the fabric member. The adjustable flap may comprise elastic material, and a detachable connection mechanism. The adjustable flap may have at least one fixed connection to the fabric member. The shortening mechanism may include at least one cinching cord routed through anchoring points on the device that may be adjustably cinched to take in some of the fabric member to reduce the effective width dimension of the fabric member.

In a second aspect, the present invention relates to a device for covering a light bar, comprising a fabric member for operable to be wrapped around and cover a light bar, the fabric member including a first fastening member for connected two perimeter edges of the fabric member, and at least one cinchable structure for tightening the base material around the light bar; a structural support rod having a length substantially equal to a length of the fabric member; and an interior compartment for storing a structural support rod. The device may further have a shortening mechanism for reducing an effective width dimension of the fabric member for adjusting the fabric member to fit over light bars of varying cross-sectional perimeters. The structure support rod may be operable to be removed from the interior compartment and may have a grasping structure operable to grasp the first fastening member and adjust the first fastening member, allowing a user to reach across a vehicle on which the light bar is mounted to grasp the first fastening member without the need to climb up on the vehicle, ladder, or other device. The shortening mechanism may include an adjustable flap of material that may be adjustably attached at different points on the fabric member to take in some of the fabric member to reduce the effective width dimension of the fabric member. The adjustable flap may include elastic material, and a detachable connection mechanism. The adjustable flap may have at least one fixed connection to the fabric member. The shortening mechanism may include at least one cinching cord routed through anchoring points on the device that may be adjustably cinched to take in some of the fabric member to reduce the effective width dimension of the fabric member.

In a third aspect, the present invention relates to a method for covering a light bar, comprising placing over a light bar a light bar cover having a fabric member operable to be wrapped around and cover the light bar, the fabric member including: a first fastening member for connected two perimeter edges of the fabric member, at least one cinchable structure for tightening the base material around the light bar, a structural support rod having a length substantially equal to a length of the fabric member, and a shortening mechanism for reducing an effective width dimension of the fabric member to fit over light bars of varying cross-sectional perimeters; cinching the shortening mechanism to reduce the effective width dimension of the fabric member to a position that accommodates the cross-section perimeter of the light bar with a tight fit; and using the structural support rod to connect the first fastening member and securing the light bar cover over the light bar. The light bar cover may include an interior compartment for storing a structural support rod, and structure support rod is operable to be removed from the interior compartment. The structural support rod has a grasping structure operable to grasp the first fastening member and adjust the first fastening member, allowing a user to reach across a vehicle on which the light bar is mounted to grasp the first fastening member without the need to climb up on the vehicle, ladder, or other device. The shortening mechanism may include an adjustable flap of material that may be adjustably attached at different points on the fabric member to take in some of the fabric member to reduce the effective width dimension of the fabric member. The adjustable flap may comprise elastic material, and a detachable connection mechanism. The adjustable flap may have at least one fixed connection to the fabric member. The shortening mechanism may include at least one cinching cord routed through anchoring points on the device that may be adjustably cinched to take in some of the fabric member to reduce the effective width dimension of the fabric member.

Additional aspects and objects of the invention will be apparent from the detailed descriptions and the claims herein.

BRIEF DESCRIPTION OF THE DRAWINGS

FIG. 5 provides a back view of an installed light bar cover, according to an embodiment of the present invention.

FIG. 6 provides a bottom view of an installed light bar cover, according to an embodiment of the present invention.

FIG. 7 provides a side view of an installed light bar cover, according to an embodiment of the present invention.

FIG. 8 provides a side view of an installed light bar cover, according to an embodiment of the present invention.

FIG. 9 provides an exterior view of a light bar cover, according to an embodiment of the present invention.

FIG. 10 provides an interior view of a light bar cover, according to an embodiment of the present invention.

FIG. 11B provides an interior view of a light bar cover, according to an embodiment of the present invention.

FIG. 11C provides an interior view of a light bar cover, according to an embodiment of the present invention.

DETAILED DESCRIPTION

Figure 1:
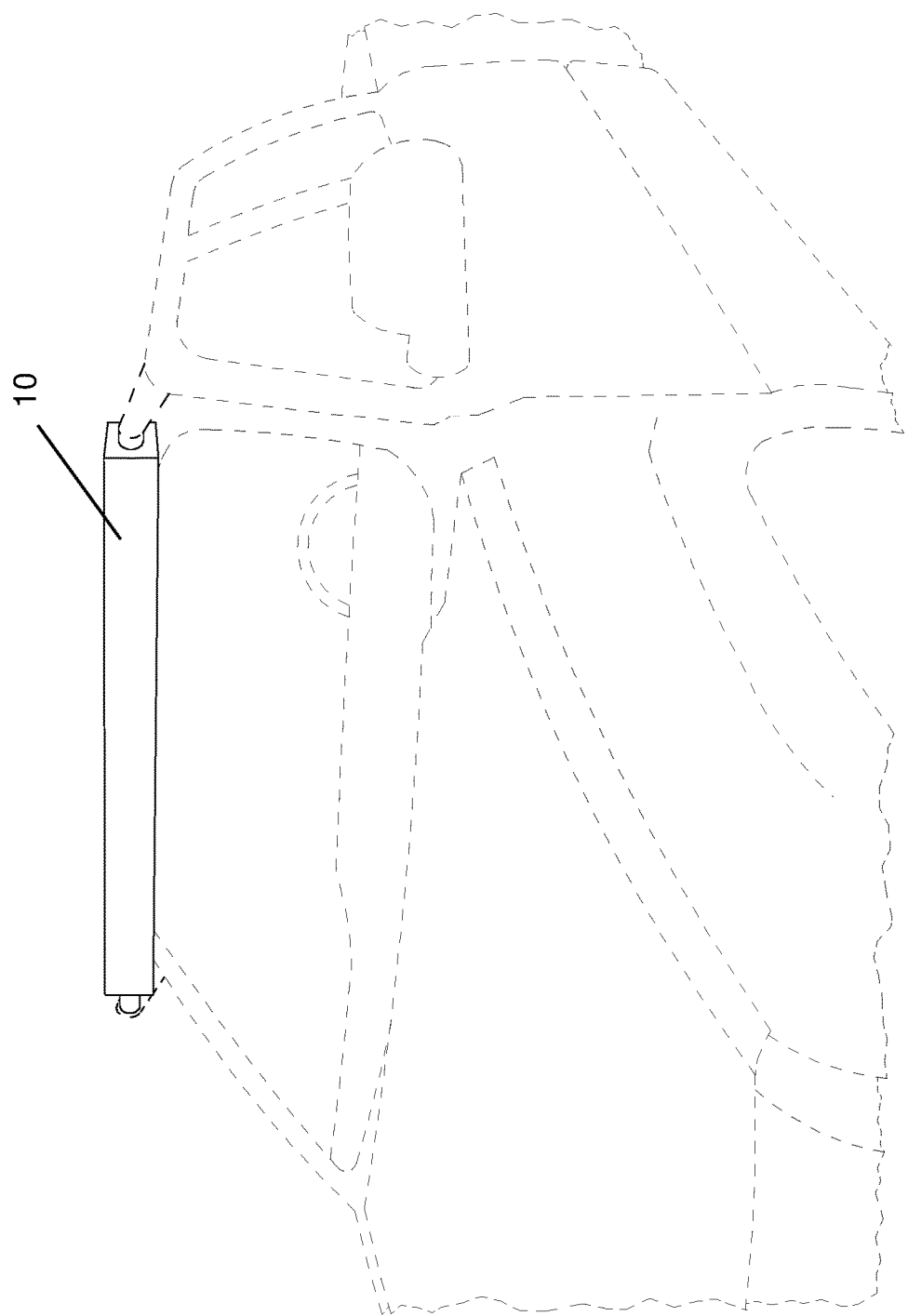
FIG. 1 provides a perspective view of an installed light bar cover, according to an embodiment of the present invention.
Figure 2:
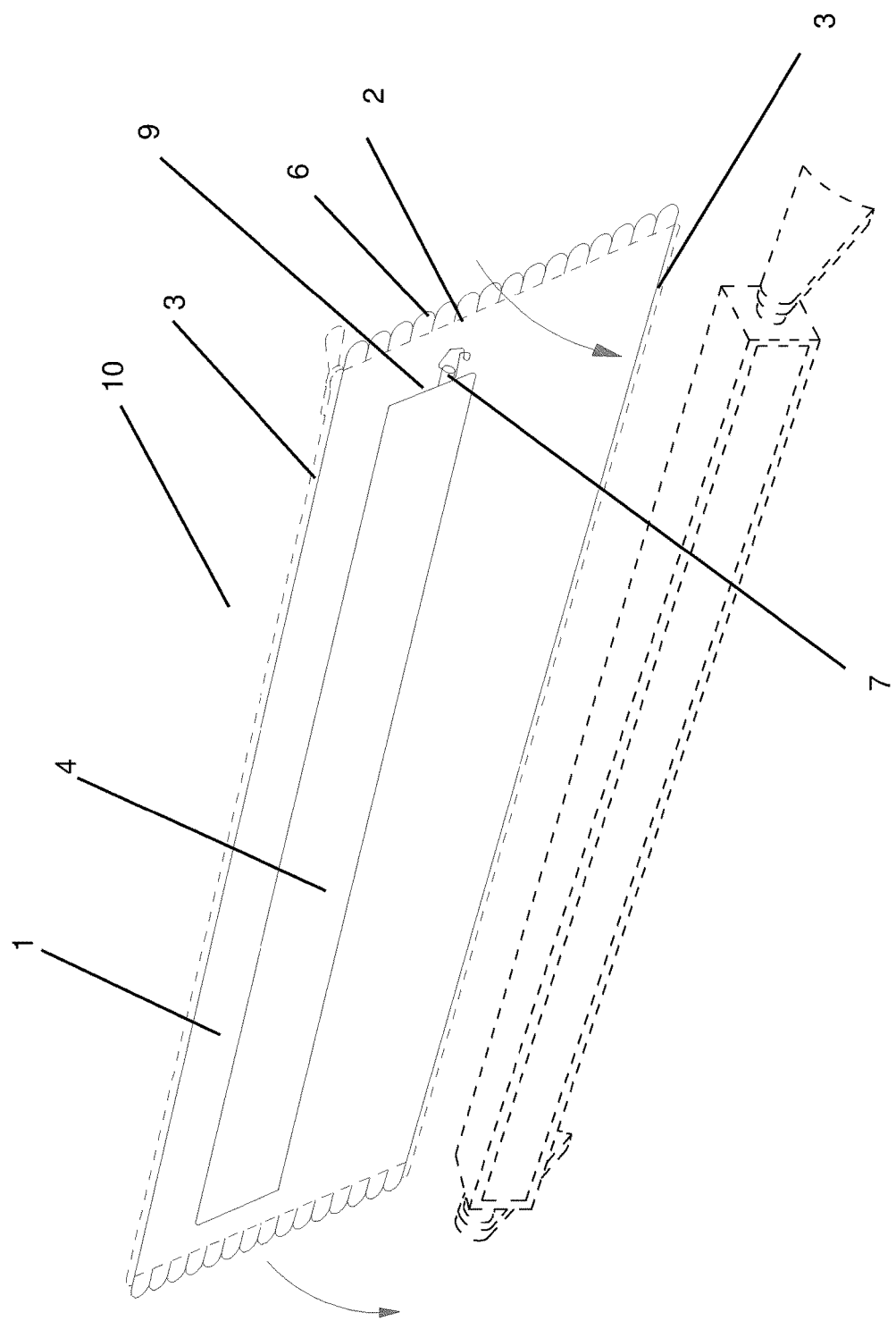
FIG. 2 provides a perspective view of a light bar cover, according to an embodiment of the present invention.
Figure 3:
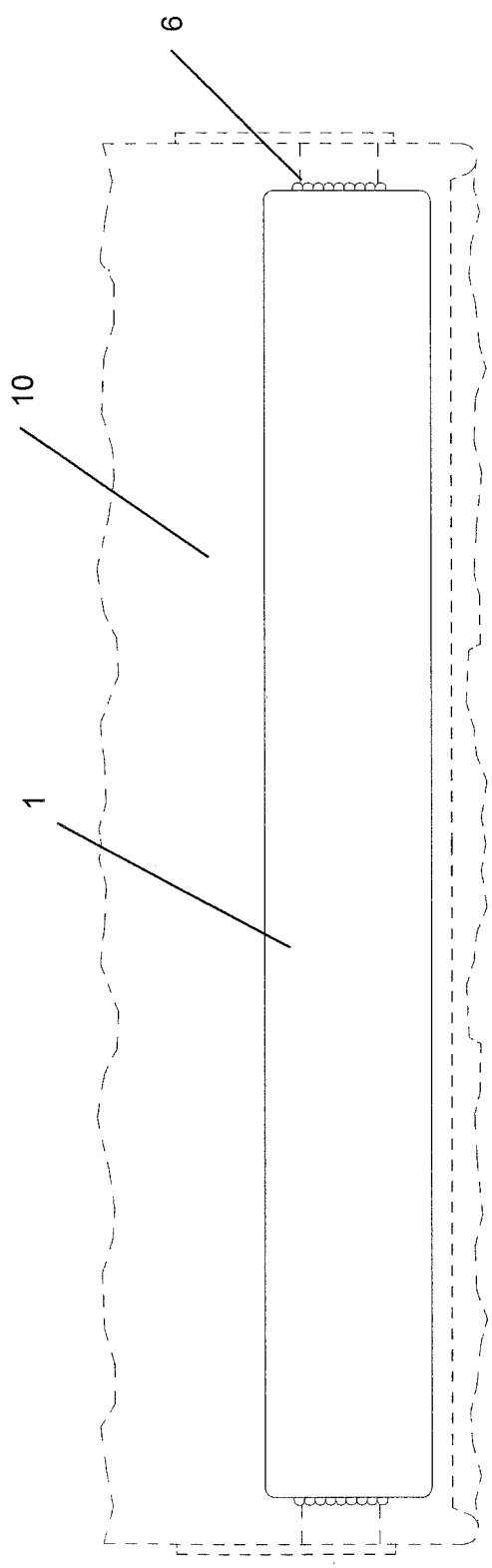
FIG. 3 provides a top view of an installed light bar cover, according to an embodiment of the present invention.
Figure 4:
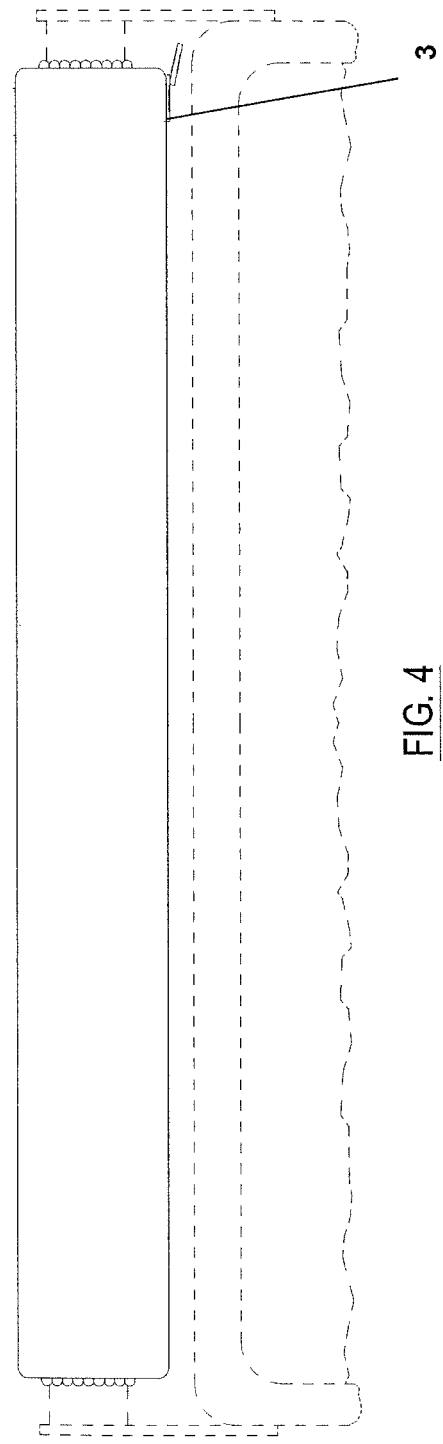
FIG. 4 provides a front view of an installed light bar cover, according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

FIGS. 1-12 illustrate an light bar cover 10 where the base material 1 is able to be fitted snugly to the forward face of the light bar positioned, e.g., over the windshield of a vehicle. The zipper 3 may be positioned on the bottom of the light bar once closed. The multi-function rod 7 may have a hook 8 and may be placed in its holder 9, or be deployed for use. Elastic bands 6 function to contract and cinch an end hem 2. A multi-purpose rod holder 9 may store the multi-purpose rod 7 and may also act as a tensioning device for adjusting the effective circumference of the light bar cover 10.

The multi-function rod 7 includes a hook 8 which may be attached to the zipper tab 5, allowing actuation of the zipper 3 for opening or closing the cover 10. The insertion of the rod 7 into the holder 9 results in stiffness facilitating ease of placement and positioning during deployment.

Figure 11A:
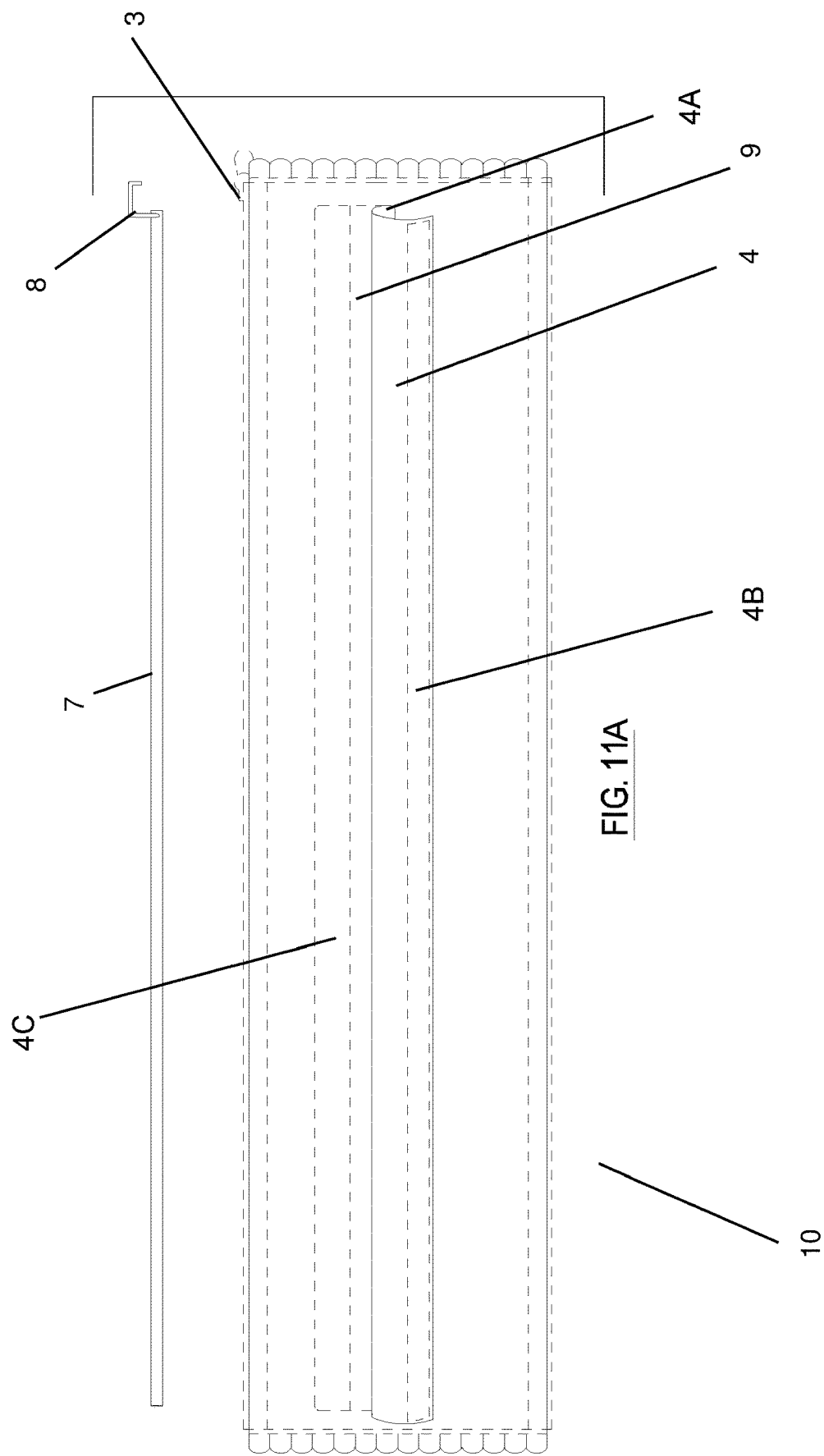
FIG. 11A provides an interior view of a light bar cover, according to an embodiment of the present invention.
Figure 12:
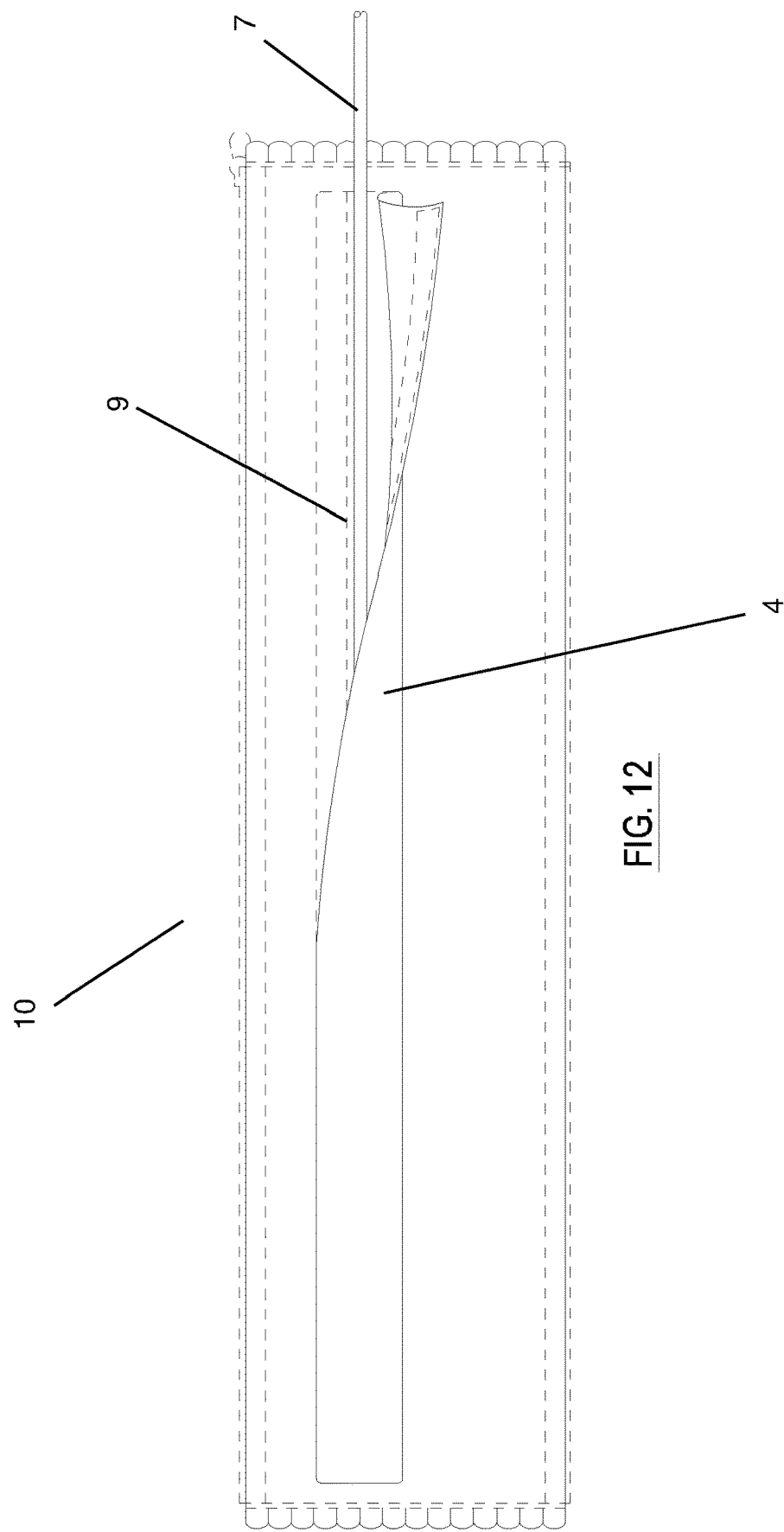
FIG. 12 provides an interior view of a light bar cover, according to an embodiment of the present invention.

The multi-purpose rod holder 9 may also include a flap of material 4 that is fixedly connected to the interior of the light bar cover 10. As shown in FIG. 11A, the flap of material 4 may have a fixed end 4a attached to the base material 1 and a hook and loop fastener 4b (Velcro) at the other that can be attached to a corresponding fastener 4c on the interior side of the light bar cover 10. The fastener 4c may have a greater width than fastener 4b to allow fastener 4b to be attached and overlap with fastener 4c at different points along the width of fastener 4c. As a result, fastener 4c may be used to draw in or let out the base material 1 in this embodiment by attaching the fastener 4b at different points on fastener 4c. For example, some of the light base material 1 may be taken in by overlapping fastener 4b with fastener 4c at the outer-most edge of fastener 4c. In contrast, the entire are of base material 1 may be used to cover the light bar when fastener 4b is positioned at the inner most edge of fastener 4c.

The outer surface of the flap 4 may include a soft, scratch-preventing material such as a microfiber, sheepskin, non-woven polypropylene fabric, polyvinyl acetate fabric, and other appropriately non-abrasive materials to act as a lens pad. The flap 4 may have sufficient size and may be positioned on the light bar cover such that it can be reliably place over the light bar lens when the light bar cover 10 is engaged over the light bar.

In some embodiments, the internal flap 4 may be constructed of an elastic or otherwise stretchable material that allows for the expansion flap to contract once the light bar cover 10 is installed over a light bar. As shown in FIG. 11B, the internal expansion flap 4 includes elastic material that allows the expansion flap to aid in creating a tight fit around the circumference of the light bar by virtue of the contraction of the elastic material in the expansion flap once the light bar cover has been installed over the light bar. The embodiment of 11B also shows snap buttons as fasteners for the perimeter edges of the light bar cover 10.

FIG. 11C shows an alternative embodiment having a cinching structure 90 on the interior side of the light bar cover 10 having two anchoring strips 91A and 91B on the lateral sides of the rod holder 9. One or more elastic cords 92 (e.g., interlacing cords) are routed between the two anchoring strips 91A and 91B through structures therein (e.g., grommets) spaced apart from one another. The elastic cords 92 may bring in the circumferential dimension of the light bar cover 10, if there is excess length that is unneeded for the light bar cover 10 to extend around the circumference of the light bar. Additionally, each lateral side of the light bar cover may include a hem (94A, 94B) that encloses a cinchable band 95A, 95B that can be tightened around the support elements at the lateral ends of a light bar. Specifically, an elastic rope or bungee cord may be enclosed in a hemmed slot along each lateral end of the light bar cover with connectors at each end that allow the elastic rope or bungee cord to be tightened around the support elements at the lateral ends of a light bar.

It should be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, and to thereby enable others skilled in the art to best utilize the invention and various embodiments with various modifications as are suited to the particular use contemplated.

What is claimed:

1. A device for covering a light bar, comprising:
   a. a fabric member operable to be wrapped around and cover a light bar, the fabric member including:
      i. a first fastening member for connecting two perimeter edges of said fabric member, and
      ii. at least one cinchable structure for tightening said fabric member around said light bar;
   b. a structural support rod having a length substantially equal to a length of said fabric member;
   c. an interior compartment for storing said structural support rod; and
   d. a shortening mechanism for reducing an effective width dimension of said fabric member for adjusting the fabric member to fit over light bars of varying cross-sectional perimeters.

2. The device of claim 1, wherein said structure support rod is operable to be removed from said interior compartment and has a grasping structure operable to grasp said first fastening member and adjust said first fastening member, allowing a user to reach across a vehicle on which said light bar is mounted to grasp said first fastening member without the need to climb up on the vehicle, ladder, or other device.

3. The device of claim 1, wherein said shortening mechanism includes an adjustable flap of material that may be adjustably attached at different points on said fabric member to take in some of the fabric member to reduce said effective width dimension of said fabric member.

4. The device of claim 3, wherein said adjustable flap comprises elastic material, and a detachable connection mechanism.

5. The device of claim 4, wherein said adjustable flap has at least one fixed connection to said fabric member.

6. The device of claim 1, wherein said shortening mechanism includes at least one cinching cord routed through anchoring points on said device that may be adjustably cinched to take in some of the fabric member to reduce said effective width dimension of said fabric member.

7. A device for covering a light bar, comprising:
   a. a fabric member operable to be wrapped around and cover a light bar, the fabric member including:
      i. a first fastening member for connecting two perimeter edges of said fabric member, and
      ii. at least one cinchable structure for tightening said fabric member around said light bar;
   b. a structural support rod having a length substantially equal to a length of said fabric member; and
   c. an interior compartment for storing a structural support rod.

8. The device of claim 7, further comprising a shortening mechanism for reducing an effective width dimension of said fabric member for adjusting the fabric member to fit over light bars of varying cross-sectional perimeters.

9. The device of claim 7, wherein said structure support rod is operable to be removed from said interior compartment and has a grasping structure operable to grasp said first fastening member and adjust said first fastening member, allowing a user to reach across a vehicle on which said light bar is mounted to grasp said first fastening member without the need to climb up on the vehicle, ladder, or other device.

10. The device of claim 8, wherein said shortening mechanism includes an adjustable flap of material that may be adjustably attached at different points on said fabric member to take in some of the fabric member to reduce said effective width dimension of said fabric member.

11. The device of claim 10, wherein said adjustable flap comprises elastic material, and a detachable connection mechanism.

12. The device of claim 11, wherein said adjustable flap has at least one fixed connection to said fabric member.

13. The device of claim 8, wherein said shortening mechanism includes at least one cinching cord routed through anchoring points on said device that may be adjustably cinched to take in some of the fabric member to reduce said effective width dimension of said fabric member.

14. A method for covering a light bar, comprising:
   a. placing over a light bar a light bar cover having a fabric member operable to be wrapped around and cover the light bar, the fabric member including:
      i. a first fastening member for connecting two perimeter edges of said fabric member,
      ii. at least one cinchable structure for tightening said fabric member around said light bar,
      iii. a structural support rod having a length substantially equal to a length of said fabric member, and
      iv. a shortening mechanism for reducing an effective width dimension of said fabric member to fit over light bars of varying cross-sectional perimeters;

b. cinching said shortening mechanism to reduce the effective width dimension of said fabric member to a position that accommodates the cross-section perimeter of said light bar with a tight fit; and c. using said structural support rod to connect said first fastening member and securing said light bar cover over said light bar.

15. The method of claim 14, wherein said light bar cover includes an interior compartment for storing said structural support rod, and said structural support rod is operable to be removed from said interior compartment.

16. The method of claim 14, wherein said structural support rod has a grasping structure operable to grasp said first fastening member and adjust said first fastening member, allowing a user to reach across a vehicle on which said light bar is mounted to grasp said first fastening member without the need to climb up on the vehicle, ladder, or other device.

17. The method of claim 14, wherein said shortening mechanism includes an adjustable flap of material that may be adjustably attached at different points on said fabric member to take in some of the fabric member to reduce said effective width dimension of said fabric member.

18. The method of claim 17, wherein said adjustable flap comprises elastic material, and a detachable connection mechanism.

19. The method of claim 17, wherein said adjustable flap has at least one fixed connection to said fabric member.

20. The method of claim 14, wherein said shortening mechanism includes at least one cinching cord routed through anchoring points on said device that may be adjustably cinched to take in some of the fabric member to reduce said effective width dimension of said fabric member.

* * * * *